United States Patent
Namdev et al.

(10) Patent No.: US 11,409,807 B2
(45) Date of Patent: Aug. 9, 2022

(54) SINGLE-CLICK MATCHMAKING

(71) Applicants: Rahul Kumar Namdev, Bangalore (IN); Pawan Kumar Gupta, Bangalore (IN)

(72) Inventors: Rahul Kumar Namdev, Bangalore (IN); Pawan Kumar Gupta, Bangalore (IN)

( * ) Notice: Subject to any disclaimer, the term of this patent is extended or adjusted under 35 U.S.C. 154(b) by 338 days.

(21) Appl. No.: 16/777,773

(22) Filed: Jan. 30, 2020

(65) Prior Publication Data

US 2021/0240771 A1 Aug. 5, 2021

(51) Int. Cl.
| | |
|---|---|
| *G06F 16/00* | (2019.01) |
| *G06F 16/9035* | (2019.01) |
| *G06F 21/33* | (2013.01) |
| *G06N 20/10* | (2019.01) |

(52) U.S. Cl.
CPC .......... *G06F 16/9035* (2019.01); *G06F 21/33* (2013.01); *G06N 20/10* (2019.01)

(58) Field of Classification Search
CPC ...... G06F 16/9035; G06F 21/33; G06N 20/10
See application file for complete search history.

(56) References Cited

U.S. PATENT DOCUMENTS

| | | |
|---|---|---|
| 6,641,481 B1 | 11/2003 | Mai et al. |
| 9,195,777 B2 | 11/2015 | Kindler et al. |
| 9,930,137 B2 | 3/2018 | Zuckerberg et al. |
| 10,069,931 B2 | 9/2018 | Wei |
| 2003/0195884 A1* | 10/2003 | Boyd ................. G06F 16/9535 |
| 2011/0196801 A1 | 8/2011 | Ellis et al. |
| 2012/0013462 A1 | 1/2012 | Tuck et al. |
| 2012/0110071 A1* | 5/2012 | Zhou ...................... G06Q 30/02 709/204 |
| 2013/0304658 A1* | 11/2013 | Zhou ...................... G06Q 50/01 705/319 |
| 2014/0074828 A1* | 3/2014 | Mathur ................. G06F 16/70 707/723 |
| 2014/0236935 A1 | 8/2014 | Doebele et al. |
| 2015/0127565 A1* | 5/2015 | Chevalier ............... H04W 4/21 705/319 |
| 2017/0017649 A1* | 1/2017 | Srinivasaraghavan .. G06N 3/08 |

(Continued)

FOREIGN PATENT DOCUMENTS

| | | |
|---|---|---|
| CA | 2739637 A1 | 11/2012 |
| CN | 102347963 B | 6/2014 |

(Continued)

*Primary Examiner* — Jared M Bibbee
(74) *Attorney, Agent, or Firm* — Helix Patent Services, LLC

(57) ABSTRACT

A single-click matchmaking system and method is disclosed providing streamlined, fast, interactive and intelligent search processes for matchmaking. The single-click matchmaking for recommending at least one match comprises receiving a profile of the user based on an input given by the user at an application running on the computing device, predicting a plurality of self-attributes of the user based on the profile of the user, predicting a plurality of preferred attributes based on the plurality of self-attributes of the user, accessing a memory configured to store data corresponding to a plurality of entities, determining the match from the plurality of entities and recommending the at least one match to display at the computing device of the user.

18 Claims, 5 Drawing Sheets

(56) References Cited

U.S. PATENT DOCUMENTS

2017/0147795 A1* 5/2017 Sardesai ................. G06F 21/41
2018/0032757 A1 2/2018 Michael
2019/0068747 A1* 2/2019 Lervik ................ G06F 16/9535

FOREIGN PATENT DOCUMENTS

| CN | 104462308 A | 3/2015 |
| CN | 108710609 A | 10/2018 |
| WO | 2019005986 A1 | 1/2019 |

* cited by examiner

SINGLE-CLICK MATCHMAKING

FIELD OF THE INVENTION

The presently disclosed subject matter relates generally to a system or a method for recommending matches to a user. More particularly, the present invention relates to recommending matches to a user based on a single-click action.

BACKGROUND

As is commonly observed, finding an accurate match can be an irritating and a time-consuming experience for many match seekers, whether one is looking for a life-partner with similar background and ethnicity, finding a suitable candidate for filling a job position, finding a business partner, room-mate, leader, coach, or health-care provider, or allowing personalized shopping on the basis of complementary interests of the match seeker.

Conventional social matching applications like eHarmony, OkCupid, Match.com and Tinder are popular. Examples of other social matching applications to make match recommendations include SocialNet, Facebook's "People you may know" feature, LooptMix, and Foursquare. These social matching applications are computer based systems that recommend a match on the basis of shared interests, professional knowledge, user preferences etc. by asking a user many questions or interviewing the user in text or oral form, resulting in a loss of interest of the user in finding an accurate and desirable match. Often, the user wants to avoid filling out lengthy forms or answering the hundreds of personal questions comprised of demographic information about their name, location, age, height, ethnicity, food habits and partner preferences (name, location, age, height, ethnicity, food habits).

Studies reveal that asking for lengthy questionnaire/answers from users can be troublesome for them, as this does not guarantee getting accurate or nearly accurate matches. The users might get easily distracted by the number of questions asked, or they might get bored during the process of filling out the details which eventually reduce the ability of accurately answering the questions.

Thus, in order to make the system streamlined, fast, interactive and intelligent, there is a need for matchmaking systems and methods that provide automatic estimation of the user's and their partner's cultural background, preferences and other information based on a minimal set of details which are provided by the user or easily taken from other third party sources. This will reduce the task of matchmaking recommendations from the current multi-click systems in place to just single-click systems.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

The present invention provides novel, interactive, fast, personalized, and intelligent recommendation systems and methods.

According to an object of the present invention, a system for recommending at least one match comprises: at least one processor adapted to communicate with at least one computing device corresponding to at least one user; and a non-transitory computer storage medium comprising at least one sequence of instruction that, when executed by the processor, causes the processor to: receive a profile of the user based on an input given by the user at an application running on the computing device; predict a plurality of self-attributes of the user based on the profile of the user; predict a plurality of preferred attributes based on the plurality of self-attributes of the user; access at least one memory configured to store data corresponding to a plurality of entities; determine the at least one match from the plurality of entities; and recommend the at least one match to display at the computing device of the user.

According to an object of the present invention, a computer implemented method is provided for recommending at least one match, the method comprising: initiating communication between at least one processor and at least one computing device associated with at least one user; receiving a profile of the user, by the processor, based on an input given by the user at an application running on a computing device; predicting a plurality of self-attributes of the user, by the processor, based on the profile of the user; predicting a plurality of preferred attributes based on the plurality of self-attributes of the user, by the processor; accessing at least one memory by the processor, wherein the memory is configured to store data corresponding to a plurality of entities; determining the at least one match from the plurality of entities; and recommending the at least one match, by the processor, for displaying at the computing device of the user.

According to an object of the invention, the processor may be adapted to receive the input from the user by performing a single-click action.

According to another object of the invention, the processor may be adapted to receive the input from the user by performing at least one of a voice command, a gesture command, a tap on a user interface button and a keystroke on a keyboard.

According to another object of the invention, the single-click action is made on a user interface of a computing device displaying a web page or an application provided by the processor.

According to another object of the invention, the single-click action is made on an application running on the computing device.

According to an object of the invention, the input is selected from a group consisting of first name, last name, date of birth, age, contact number, gender, e-mail, verification code, and a combination thereof.

According to another object of the invention, the processor is adapted to generate the verification code such as, but not limited to, a One Time Password (OTP), an encrypted code, or a combination thereof.

According to another object of the invention, the input comprises a login credential of the user corresponding to at least one third party source.

According to another object of the invention, the input comprises saved cookies used to authenticate in lieu of the user using login and password.

According to another object of the invention, the input comprises biometric data including, but not limited to, face, iris, body posture, fingerprint, palm prints, body movements, or combination thereof, used to authenticate the user for accessing the third party source to obtain the profile.

According to another object of the invention, the processor is adapted to receive the profile, wherein the profile of the user is generated from the input provided by the user.

According to another object of the invention, the processor is adapted to receive the profile, from at least one third party source.

According to another object of the invention, the third party source is selected from a group consisting of a social networking application, a talent hiring application, an on-demand service provider application, a banking application, a travel application, a food provider application, a shopping application, a dating application, a matchmaking application, an e-commerce application, an educational institute application, a real-estate application, a health institute application, a photosharing application, a gaming application, a news application, an event application, a fitness application, a browsing application, an email application, and a combination thereof.

According to another object of the invention, the self-attribute is selected from a group consisting of religion, community, age, height, gender, demographic profile, location, IP address, food habits, mother tongue, education, hobbies, occupation, interests, user's personality, user-specific preferences, ethnicity, job industry, and a combination thereof.

According to another object of the invention, the preferred attribute is selected from a group consisting of religion, community, age, height, gender, demographic profile, location, IP address, food habits, mother tongue, education, hobbies, occupation, interests, user's personality, user-specific preferences, ethnicity, job industry, and a combination thereof.

According to another object of the invention, the entity is selected from a group consisting of partner seekers, job opportunities, goods, products, food items, apparels, vehicles, real-estate, educational institutes, health institutes, games, news, social fitness, events, e-commerce, media, and a combination thereof.

According to another object of the invention, the recommended matches are displayed in an enhanced graphical manner for easy viewing of the recommended matches by the processor.

According to another object of the invention, the matches are shown in the form of a URL link to a website or an application.

According to another object of the invention, the user can specify, before, during or after a search, a limit on the number of recommended results the user would like to receive.

According to another object of the invention, the processor is configured to provide an individual rank to the at least one match and generate a list to display at the computing device of the user.

According to another object of the invention, the processor may be programmed to list all the matches with their matching score from 1% to 100% in descending/ascending order.

According to another object of the invention, the processor is configured to receive a feedback from the user upon displaying the at least one match on the computing device of the user.

According to another object of the invention, the processor is configured to modify a recommendation of the at least one match for another user based on the feedback provided by the user.

According to another object of the invention, the processor is configured to incrementally learn from the feedback provided by the user and provides refined results in new subsequent searches in the future for another user.

According to another object of the invention, the computing device is selected from a group consisting of a personal digital assistant (PDA), a desktop computer, a television, a pager, a palmtop, a laptop, a notebook, a tablet computer, a mobile phone, a smartphone, a smart-watch, a wearable device, a portable electronic device, and a combination thereof.

According to another object of the invention, the self-attributes and the preferred attributes are predicted using a machine learning algorithm, wherein the machine learning algorithm is selected from a group consisting of SVM, regression model, classification model, deep-learning model, neural network, random forest feature importance, cross-tabulation, heat-map, one hot encoding, Bayesian classifier, decision tree, and a combination thereof.

According to another object of the invention, the processor is configured to provide the user with an option to modify at least one of the self-attribute, the preferred attribute, and a combination thereof.

It would be understood that any embodiments disclosed herein can be applied, when applicable, in any object of the invention, alone or in any combination.

Details of one or more implementation are set forth in the accompanying drawings and the description below. Other features, aspects, and potential advantages will be apparent from the description and drawings, and from the claims.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

DETAILED DESCRIPTION OF THE PREFERRED EMBODIMENT

Embodiments of the present invention are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other feature, integers, steps, operations, elements, components, and/or groups thereof. As used herein, the term "and/or" includes any and all combinations of one or more of the associated listed items.

Figure 1:
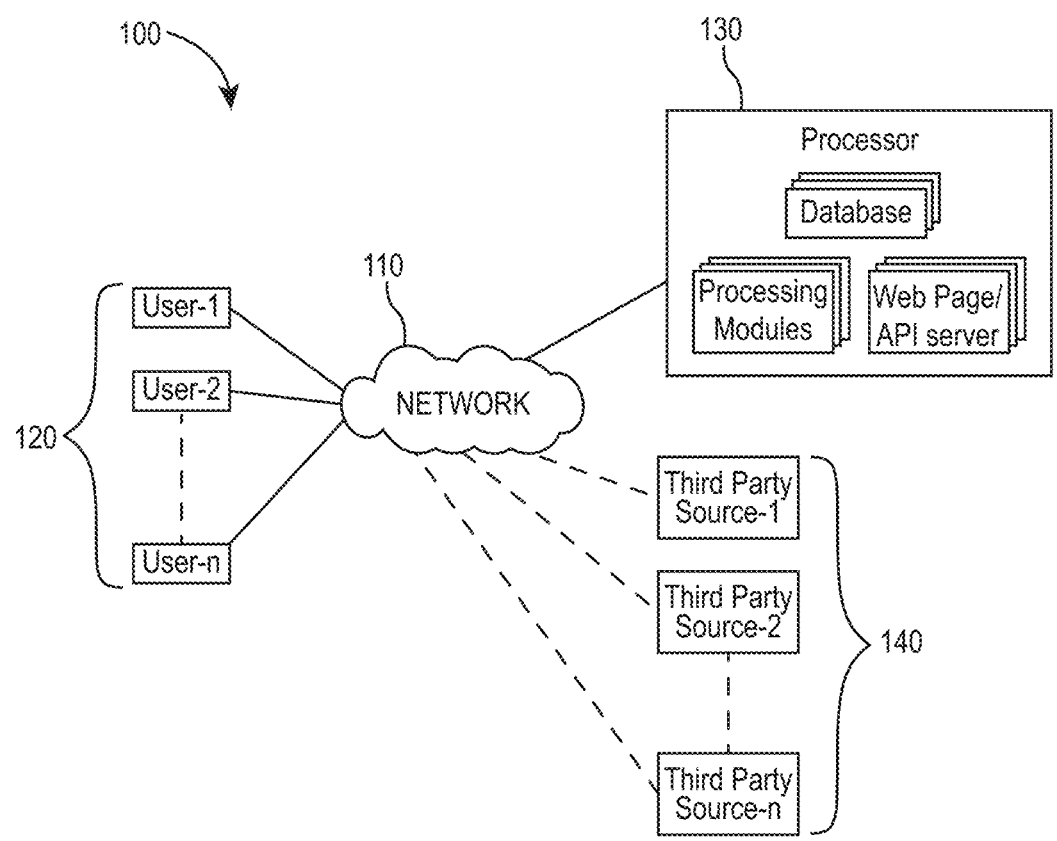
FIG. 1 illustrates an exemplary single-click matching system consistent with disclosed embodiments.

Referring to the figures, wherein the components are labeled with like numerals throughout the several figures, and initially referring to FIG. 1, illustrates a block diagram of an illustrated embodiment of a system 100 for performing interactive, personalized and intelligent matches based on a single-click action by a user. The system 100 comprises a communication network 110, a computing device 120, a processor 130 and a third party source 140. In an embodiment of the present invention, the components and arrangement of the components included in the system 100 may vary. In another embodiment of the present invention, the system 100 may further comprise other components that perform or assist in the performance of one or more process. For example, in one embodiment of the present invention the system 100 shown by FIG. 1 includes one processor 130, a plurality of computing devices 120 and/or a plurality of third party sources 140. However, in another embodiment, the system 100 may comprise a plurality of processors 130, one computing device 120 and/or one third party source 140. In yet another embodiment of the present invention, the system 100 may comprise plurality of processors 130, a plurality of computing devices 120 and/or a plurality of third party sources 140.

The computing device 120 is configured to receive an input from the user and communicate data via the network 110 with the processor 130. Examples of the computing device 120 may include, but are not limited to, a personal digital assistant (PDA), a desktop computer, a television, a pager, a palmtop, a laptop, a notebook, a tablet computer, a mobile phone, a smartphone, a smart-watch, a wearable device, a portable electronic device, or a combination thereof. In one embodiment of the present invention, the computing device 120 may comprise one or more processors configured to execute the set of instructions stored in a memory (not shown). The computing device 120 may perform processes for displaying matches and internet related communications. For example, the computing device 120 may execute browser software or an application to display a recommended match on a display (not shown).

The processor 130 is configured to communicate over communication network 110 with a computing device 120 corresponding to the user. The processor 130 may comprise one or more storage modules storing data and the software instructions and one or more processing modules configured to use the stored data and execute the software instructions to perform server-based operations known to those skilled in the art. In one embodiment of the present invention, the processor 130 may be configured to execute a set of instructions that interact with software program(s) stored and executed by the computing device 120.

In one embodiment of the present invention, the processor 130 may be an application-specific integrated computer (ASIC), a general purpose computer, or a combination thereof. In another embodiment of the present invention, the processor 130 may be configured as an apparatus, a system, or the like based on the implementation of the instructions that perform one or more operations as disclosed herein. In another embodiment of the present invention, the processor 130 may be a standalone, or may be a part of subsystem of a larger system. In yet another embodiment of the present invention, the processor 130 may represent distributed servers that are remotely located and communicate over the network (e.g. network 110). In yet another embodiment of the present invention, one or more processing modules may represent one or more distributed servers. In yet another embodiment of the present invention, the processor 130 may further be in communication with one or more cooperating servers. In this case, one or more users of the computing device 120 associated with the online matchmaking event may be subscribed to the cooperating servers, wherein the cooperating servers provide profile information for their subscribers to the processor 130 for storage in a database of the processor 130.

The processor 130 comprises one or more storage modules, or may connect to one or more storage modules configured to store data that are utilized by the processor 130 to execute several functions. In one embodiment of the present invention, separate programs, computers or servers are configured to perform the dedicated task(s). For example, the processor 130 may comprise memory that stores the information about a plurality of entities disclosed herein. In another example, the processor 130 may access one or more memory elements located remotely for information about the plurality of entities and the programs stored that, when executed, perform one or more operations consistent with the disclosed embodiments. In one embodiment of the present invention, program instructions to execute one or more operations, such as, but not limited to, scheduling a matchmaking event, receiving a single-click action to the matchmaking event from the user, accessing the one or more memory to obtain profiles for each of the plurality of entities, processing rules for matching subsets of the plurality of entities based on complementary interests of the users defined within their profiles, processing the feedback from the plurality of users, and identifying and refining the matches based on the processed feedback.

Figure 4:
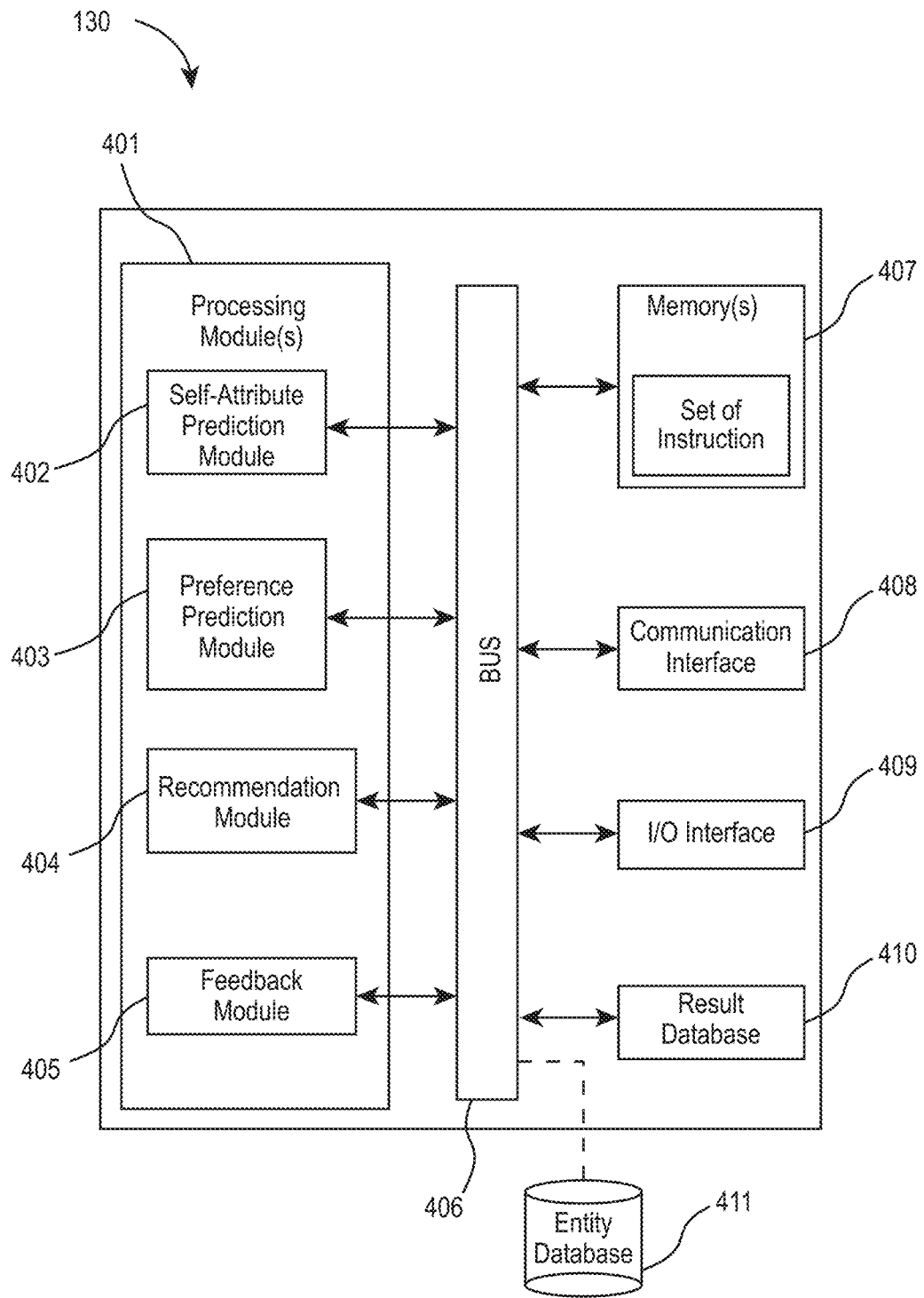
FIG. 4 is a block diagram of an exemplary processor, consistent with the disclosed embodiments.

In another embodiment of the present invention, while the processor 130 and the computing device 120 may form system 100, they may also cooperate with other systems, for example with one or more third party sources 140 of other service providers. In one embodiment, the communication module 408 (as shown in FIG. 4) may be configured to connect with one or more third party sources 140, possibly via the network 110 (e.g. through the Internet), to transmit user profile to the processor 130, once the request by the processor 130 is made. One or more third party sources 140 may be executed on one or more cooperating server (not shown) and are connected to the processor 130. In another embodiment of the present invention, one or more third party sources 140 are connected to the processor 130 via an API or other communication channels.

Non-limiting examples of the third party source 140 is selected from a group consisting of a social networking application, a talent hiring application, an on-demand service provider application, a banking application, a travel application, a food provider application, a shopping application, a dating application, a matchmaking application, an e-commerce application, an educational institute application, a real-estate application, a health institute application, a photosharing application, a gaming application, a news application, an event application, a social fitness application, a browsing application, an email application, and a combination thereof.

The network 110 is configured to provide communication, and/or facilitate the exchange of information between various components of the system 100. In some examples, the network 110 may be a wired or a wireless network. The network 110 may be a Local Area Network (LAN) that may be implemented using a TCP/IP network and may implement voice or multimedia over Internet Protocol (IP) using a Session Initiation Protocol (SIP). Further, the network 110 may further be connected to a gateway (not shown) which may be implemented as a gateway to a Private Branch Exchange (PBX) (not shown), a Public Switched Telephone Network (PSTN), or any of a variety of other networks, such as, wireless or cellular networks. The network 110 facilitates connection through WiFi, radio, Ethernet, Internet, or a combination thereof.

Figure 2:
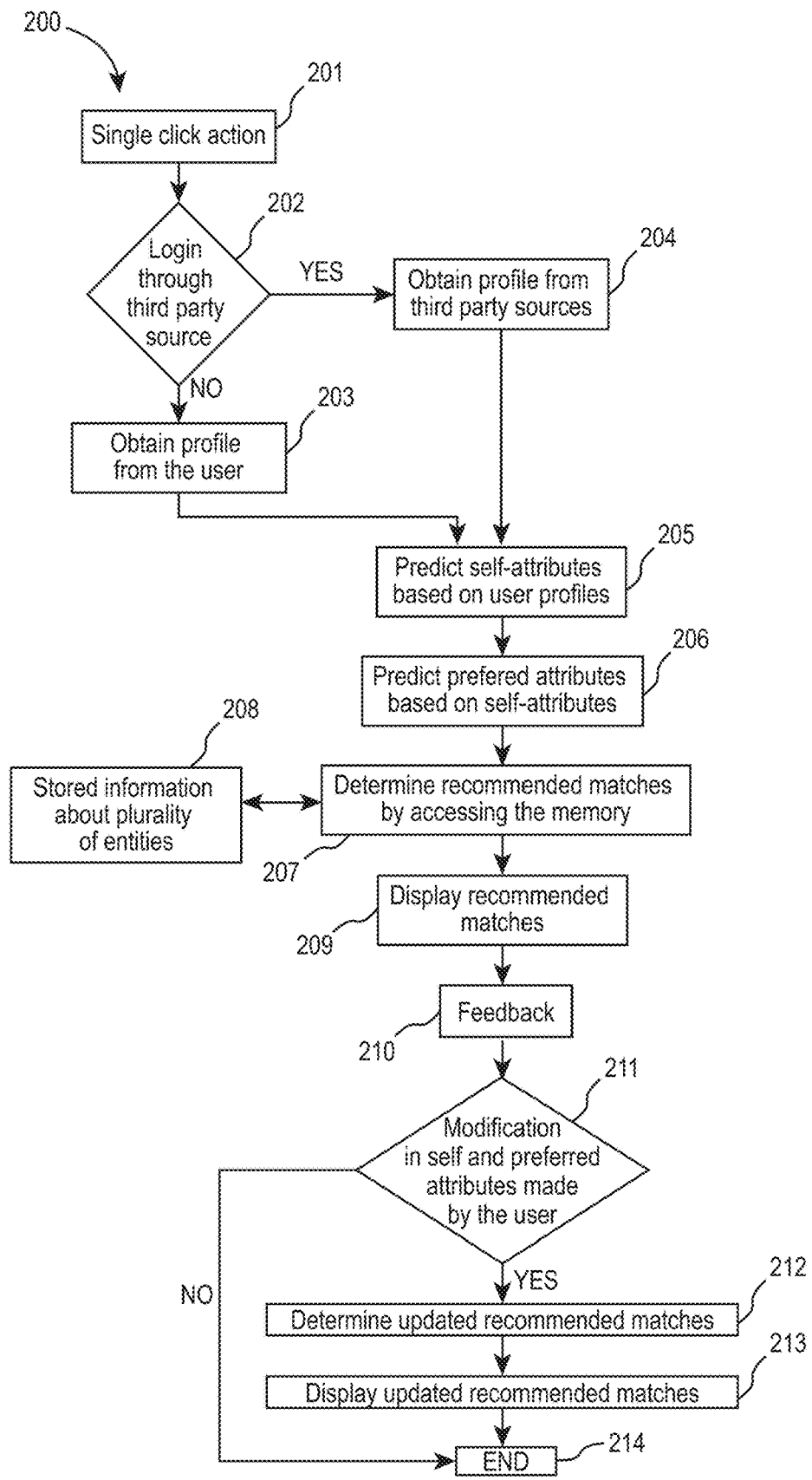
FIG. 2 depicts a flow diagram of a process of an example method for facilitating matching algorithms to perform interactive, personalized and intelligent matchmaking.

FIG. 2 schematically shows an example flow diagram of a method 200 to facilitate matching algorithms to perform interactive, personalized and intelligent matchmaking arranged in accordance with at least some embodiments described herein.

Method 200 may be implemented in a system such as the system shown in FIG. 1. Method 200 may include one or more operation, action, or function as illustrated by one or more block 201, 202, 203, 204, 205, 206, 207, 208, 209, 210, 211 and/or 212. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 201, the processor 130 may be adapted to receive the input when the user performs the single-click action such as, but not limited to, a click on a user interface button, a keystroke on a keyboard, any gesture, voice command, eye movement, motions, emotions, or a combination thereof. In one embodiment of the present invention, the single-click action is made on a user interface displaying a web page provided by the processor 130. In another embodiment of the present invention, the single-click action is made on an application running on the computing device 120. In yet another embodiment of the present invention, the single-click action may be in any other form based on the hardware capability of the computing device 120. When the user performs the single-click action, the computing device 120 notifies the processor 130 to start the process of finding the potential match. At block 202, the processor 130 may be adapted to check whether the profile is to be obtained from the third party source 140 or not. When the processor 130 receives the profile directly from the user, the flow continues to block 203.

At block 203, the input may be entered, gathered and utilized to generate the profile that is associated with the user, wherein the input is selected from a group consisting of first name, last name, date of birth, age, page likes, common interests, contact number, gender, e-mail, and a combination thereof. In one embodiment of the present invention, a verification code may be provided by the user for authentication when the user attempts to provide the input. The processor 130 is adapted to generate the verification code such as, but not limited to, a One Time Password (OTP), an encrypted code, or a combination thereof. In another embodiment of the present invention, the user may provide the input without providing any secure mechanism. In yet another embodiment of the present invention, the input is provided from the microphone i.e. a real-time voice of the user.

When the profile is automatically obtained from the at least one third party source 140, the flow continues to block 204, wherein the input comprises login credentials corresponding to at least one third party source 140. In another embodiment of the present invention. In yet another embodiment of the present invention, the input comprises CAPTCHA, any security question, username, or a combination thereof. In yet another embodiment of the present invention, the input comprises biometric data such as, but not limited to, face, iris, body posture, fingerprint, palm prints, body movements, or combination thereof, used to authenticate the user for accessing the third party source 140 to obtain the profile. In yet another embodiment of the present invention, other kinds of sensors can be used to authenticate the user, including, for example, but not limited to accelerator, gyro, motion, heart rate, etc. Based on various inputs, the processor 130 is adapted to recognize the user and further predict the user's self-attributes (at block 205 via self-attribute prediction module 402 as shown in FIG. 4) based on information provided by the third party source 140 for the authenticated user. For privacy concerns, it is possible to restrict access to some portion of the information obtained from the third party sources 140. The information related to the user can never be accessible by other networks without the user's permission. In one embodiment of the present invention, the user can select the user's information from the third party source 140 for which access is to be provided to the processor 130.

As disclosed herein, the processor 130 is adapted to perform different tasks in response to different input types by the user. For example, but not limited to, if the input is in text form, natural language learning (NLP) is applied, if input is a human voice, voice recognition and natural language learning (NLP) is performed. If input is from any other sensor, then sensor data understanding will be applied.

At block 205, the processor 130 is adapted to predict a plurality of self-attributes of the user based on the profile of the user, wherein the profile is selected from a group consisting of first name, last name, age, date of birth, gender, e-mail, and a combination thereof. In one embodiment of the present invention, the profile is generated from the input entered manually by the user. In another embodiment, the profile is generated from the input automatically obtained from one or more third party sources 140. The processor 130 at step 205 processes the profile received (for example, at self-attribute prediction module 402 as shown in FIG. 4) using one or more algorithms to analyze and to convert into one or more machine understandable data such as, but not limited to, text, meta data, features, templates, and a combination thereof to process and predict the self-attributes associated with the user. The processed and predicted self-attributes comprise data fields such as, but not limited to religion, community, age, height, gender, demographic profile, location, IP address, food habits, mother tongue, education, hobbies, occupation, interests, user's personality, user-specific preferences, ethnicity, job industry, or a combination thereof.

The above-mentioned examples of prediction of self-attributes are for illustration purposes, many other self-attributes of the user may be predicted in similar manner. As disclosed herein, no separate input from the user is needed to predict the self-attributes (i.e. user information, user preferences, user attributes). Rather, the system can automatically perform continuous recognition of the user while the user interacts with the system through deep-learning models, adaptive learning models and/or any other model.

At step 206, the processor 130 is adapted to predict a plurality of preferred attributes (for example, at preference prediction module 403 as shown in FIG. 4) of the user based on the plurality of self-attributes. The processed and predicted self-attributes obtained at block 205 describes personality traits, educational levels, jobs or careers, hobbies, activities, physical characteristics or any other information about the user that may provide a basis for predicting the preferred attributes of a potential match for the user.

The processor 130 can use one or more machine learning algorithms to generate the plurality of preferred attributes. For example, the processor 130 may infer that the user is a female of a particular age, indicated by a variable x. Such inference is based on the input provided by the user. Based on the predicted self-attributes i.e. female and age, the processor 130 is capable of predicting that the female of age x prefers a match with an age range of (x−1) to (x+5). In another embodiment of the present invention, the range of age predicted by the processor 130 may vary. In the scenario described above, where the user's self-attributes (i.e. regular user or designer and male or female) are predicted, the preferred attribute of the match for the user is inferred where it is said that if the regular user searches for handbags, it would be more likely to search for handbags to buy. While a search for designer handbags, it would be more likely to search for handbag designs and more professional handbag information. Further, if it is predicted the user is female, then the handbags recommended would be female handbags. Instead of interrogating the user about the preferred attributes that the user wants from the match, the system is itself capable of predicting the attributes of preferred match for the user.

Some non-limiting examples of machine learning algorithms that can be used to predict the self-attributes and the preferred attributes to generate and recommend the match may comprise an algorithm, such as, but not limited to, SVM regression model, classification model, deep learning model, random forest feature importance, cross-tabulation, heatmap, Bayesian classifier, decision tree, neural network, traditional feature extraction, pattern recognition method, or a combination thereof.

At block 207, the processor 130 is adapted to determine the compatible match for the user by performing a comparison between the preferred attributes and the stored information about the plurality of entities by accessing a memory 410 or 411 (as shown in FIG. 4) at block 208. After receiving the preferred attributes of the user at step 206, the information is passed to the processor 130 where a processing program is executed. The processing program, based on the preferred attribute information, formulates a query and tells the processor 130 to access the memory 410 or 411 to execute the search. After the algorithm finishes searching through the memory 410 or 411, it sorts and ranks the recommended matches in descending/ascending order. Once rank is given to the recommended matches, the processor 130 stops executing the query and returns the matches to the processing program, at block 207, and displayed to the user at block 209. In one embodiment of the present invention, the processor may be programmed to list all the matches with their matching score from 1% to 100% in descending/ascending order. In another embodiment of the present invention, the processor 130 may be programmed to display matches having a matching score higher than a certain threshold level. In one embodiment of the present invention, the threshold level may be defined by the system. In another embodiment of the present invention, the threshold level may be defined by the user once the matches are obtained. For example, the algorithm may display the matches whose matching score with the user exceeds 50%. In one embodiment of the present invention, the user can specify, before, during or after a search, a limit on the number of recommended results the user would like to receive. In another embodiment of the present invention, such a limit can be specified as a part of the user's feedback. In yet another embodiment of the present invention, such a limit can be specified automatically by the processor 130.

The memory, at block 208 stores information about a plurality of entities, wherein the entity is selected from a group consisting of partner seekers, job opportunities, goods, products, food items, apparels, vehicles, real-estate, educational institutes, health institutes, games, news, social fitness, events, e-commerce, media, and a combination thereof. The memory can be located in the local system, the cloud, or a combination thereof. In one embodiment of the present invention, the memory may be a part of the processor 130 labeled with reference numeral 410 (as shown in FIG. 4). In another embodiment of the present invention, the memory may be located remotely from the processor 130 labeled with reference numeral 411 (as shown in FIG. 4). In another embodiment of the present invention, the memory may be present both internally and accessed externally by the processor 130. The memory (410 or 411) may include one or more storage devices that store private and sensitive information about the plurality of entities and are accessed and/or managed by the processor 130. In one embodiment of the present invention, the data stored in memory about the plurality of entities is at least periodically updated to provide the updated information.

At block 209, the processor 130 is adapted to present the recommended match to the user to display at the computing device 120. The recommended matches presented to the user are modified or processed for enhanced readability. In one embodiment of the present invention, the matches are shown in the form of a URL link to a website or an application. In another embodiment of the present invention, the matches are displayed in form of 3D/2D visual displays (for example, but not limited to, images, videos, animations). In yet another embodiment of the present invention, key graphic elements from matches can be extracted in addition to some important information such as, but not limited to, contact information of a person, price information of the item. In another embodiment of the invention, the user has the opportunity to view more information about the recommended match, contact him/her, or may modify the search if the satisfactory match was not found.

At block 209, the processor 130 is adapted to render and present the recommended matches to the user on the computing device 120. The user reviews and evaluates the presented recommended matches and provides a feedback (for example, at the feedback module 405 as shown in FIG. 4) at step 210, wherein the feedback is related to accepting or declining the recommend match provided by the processor 130, searched on the basis of automatically predicted self-attributes and preferred attributes. In one embodiment of the present invention, the user feedback input can be a simple Yes or No answer. In another embodiment of the present invention, the user feedback input can be a thumbs up or a thumbs down indication. In yet another embodiment of the present invention, the user feedback input can be any other suitable indication to indicate the feedback. In yet another embodiment of the present invention, the user feedback input can be typed in text. In yet another embodiment of the present invention, the user feedback input can be a voice command, an image data, an uploaded file, or a combination thereof.

If the user indicates that the recommended matches are satisfactory and no modification is done by the user, the process jumps to block 214 and ends. If the user suggests that the additional improvement is required, then the additional modification in predicted self-attributes and preferred attributes will be performed by the user (e.g. at block 211). In this case, if the user wants to refine the matches, the processor 130 interacts with the user to ask for feedback input to help in refining the search.

As disclosed herein, the feedback provided by the user is converted into machine understandable information by the AI-based processor 130 (e.g. the feedback module 405 as shown in FIG. 4). This information can be any metadata, a hashed information, any features, text phrases, or a combination thereof.

At block 212, based on the modifications provided by the user updated matches are determined by the processor 130. At block 213, the processor 130 is adapted to render and present the updated recommended matches to the user on the computing device 120. The process jumps to block 214 and ends after displaying the updated recommended matches.

In another embodiment of the present invention, based on the feedback provided by the user the machine learning algorithms can be configured to adaptively develop and update the models (for example, but not limited to, SVM regression model, classification model, deep-learning model) over time. For example, the models can be regenerated on a periodic basis from the modifications made by the user in the self-attributes and the preferred attributes in the form of the feedback to keep the predictions in the model more accurate as the user information evolves over time. The processor 130 is configured to modify recommendations of the at least one match for another user based on the feedback provided by the user, thereby training the system 100. For example, if the user does not like the match because of some reasons, he/she provides a feedback to the processor for that particular match, the processor incrementally learns from this feedback and provides refined results in new subsequent searches in future. Various mechanisms (for example, learning mechanisms) can be used to further develop and improve the intelligence of the system 100.

The systems and methods disclosed herein are also relevant for searches within the context of Augmented Reality (AR) or Virtual Reality (VR), where the user input is often minimal. In an illustrated embodiment of the present invention, a certain level of autonomy is provided by the system 100; i.e. many aspects of the functionality of the system 100 can be automatically run with no or very little inputs from the user.

Figure 3:
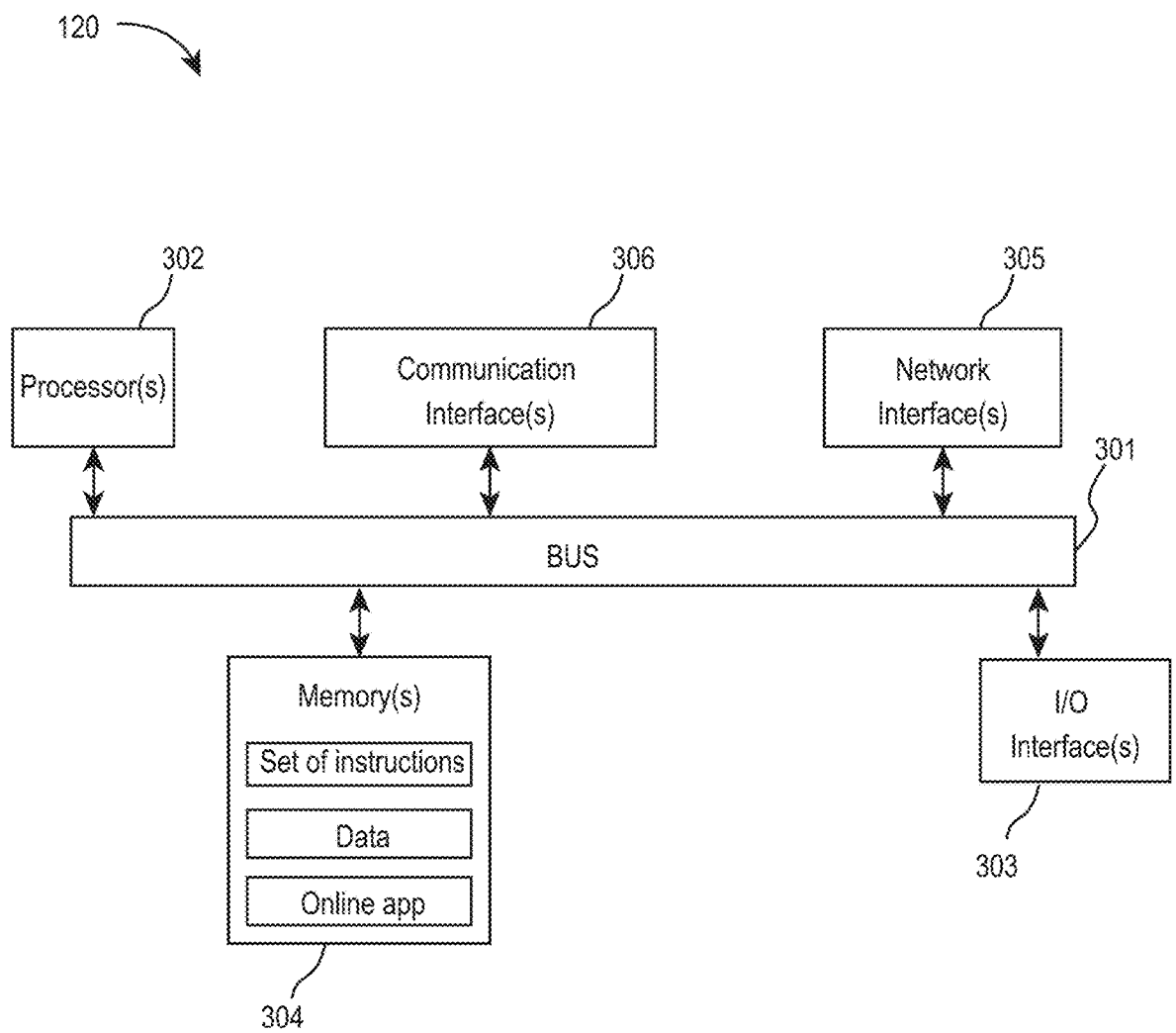
FIG. 3 is a block diagram of an exemplary computing device, consistent with the disclosed embodiments.

FIG. 3 schematically shows a block diagram of an illustrative example of the computing device 120 for facilitating match making in accordance with at least some embodiments described herein. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computer and associated components.

The computing device 120 may comprise a system bus 301, one or more processors 302, one or more input/output (I/O) interfaces 303, one or more memory 304, one or more network interfaces 305 and a communication interface 306. In one embodiment of the present invention, the computing device 120 may be a general purpose computer, a mainframe computer, or a combination thereof. In another embodiment of the present invention, the computing device 120 may be configured as a personal digital assistant (PDA), a desktop computer, a television, a pager, a palmtop, a laptop, a notebook, a tablet computer, a mobile phone, a smartphone, a smart-watch, a wearable device, a portable electronic device, and/or other device that can be used to interact with the system 100 for performing interactive, personalized and intelligent searches and display matches. In yet another embodiment of the present invention, the computing device 120 may be configured as a particular apparatus, system, and the like based on one or more operation performed. In yet another embodiment of the present invention, the computing device 120 may be a part of a subsystem of a larger system or may be standalone device.

One or more processors 302 may comprise one or more processing modules already known to the skilled in the art person, such as a microprocessor from Pentium or Xeon, or any other processors. It is to be understood that the disclosed embodiments described herein are not limited to any type of processor(s) configured in the computing device 120.

Further, attached to the system bus 301 is an I/O interface 303 for connecting various input and output devices (e.g., keyboard, mouse, displays, printers, speakers, etc.) to the computing device 120. The I/O interface 303 is used to receive input from the user and present output to the user, using audio, video, motion, and/or haptic output. In one embodiment of the present invention, the I/O interface 303 is configured to receive input from a touch sensitive user interface or a keystroke on a keyboard. In another embodiment of the present invention, the I/O interface 303 is configured to receive a voice command, a gesture command, a body movement, eye movement, facial expression, or a combination thereof. The I/O interface 303 provides a Graphical User Interface (GUI) for performing searches, as described herein. In one embodiment of the present invention, the I/O interface 303 allows the user to browse through the recommended matches. In another embodiment of the present invention, the I/O interface 303 allows the user to modify the self-attributes and the preferred attributes. In yet another embodiment of the present invention, the I/O interface 302 further provides a Graphical User Interface (GUI) for performing the searches, as described herein.

Memory 304 may include one or more storage devices configured to store a plurality of set of instructions used by the processor 302 to perform operations related to the disclosed embodiments. In one embodiment of the present invention, the memory 304 may comprise a single program that performs the functions of the computing device 120. In another embodiment of the present invention, memory 304 may comprise multiple programs. Additionally, the memory 304 is configured to store an online application, such as a matchmaking application. The memory 304 performs operations and generates information that is displayed on the I/O interface 303 (e.g. a display). The application may be configured to receive the single-click action from the user to predict and generate information, analyze the potential matches, and provide the recommended matches. The system 100 does not utilize the user information stored in the computing device for predicting the self-attributes and preferred attributes. Further, the system 100 may utilize the memory 407 (explained in FIG. 4 later) for recommending matches, wherein the memory 407 is remote to the computing device 120. The memory 304 may comprise high-speed random access memory and/or non-volatile memory, such as one or more magnetic disk storage device, one or more optical storage device, and/or flash memory (e.g., NAND, NOR).

A network interface 305 allows the computing device 120 to connect to various other devices attached to the network (for example, network 110). Additionally, the communication interface 306 is configured to communicate with other machines, subsystems, sensors and devices, such as other components of the system 100 to facilitate multiple functionality. The communication functions can be facilitated through one or more wireless communication systems, such as, but not limited to, radio frequency and/or infrared receivers and transmitters. The communication interface 306 may be designed to operate over a GSM network, a GPRS network, an EDGE network, a Wi-Fi or WiMax network, and a Bluetooth network etc.

FIG. 4 schematically shows a block diagram of an illustrative example of the processor 130 for facilitating features and processes provided in FIG. 2. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computer and associated components.

The processor 130 may comprise one or more processing modules 401, a bus 406, one or more memory elements 407, a communication interface 408, an I/O interface 409, and a result database 410. The processor 130 may be an application-specific integrated computer, a general purpose computer, or a combination thereof. In another embodiment of the present invention, the processor 130 may be configured as an apparatus, a system, or the like based on the implementation of the instructions that perform one or more operations as disclosed herein. In another embodiment of the present invention, the processor 130 may be a standalone, or may be a part of subsystem of a larger system. One or more processing modules 401 may comprise a self-attribute prediction module 402, a preference prediction module 403, a recommendation module 404, and/or a feedback module 405. The functionality of the system as disclosed herein can be achieved by connecting different processing modules (e.g. modules 401-405), as illustrated in FIG. 4.

In one embodiment of the present invention, the one or more processing modules may comprise the self-attribute prediction module 402 configured to predict the self-attributes of the user once information is received directly from I/O interface 303 for processing. In another embodiment of the present invention, the self-attribute prediction module 402 is configured to predict self-attributes of the user once information is received from the third party source 140. In another embodiment of the present invention, at a feedback module 405, the user can provide instant feedback if the recommended matches provided to the user are derived to be unsatisfactory. In this case, the self-attribute prediction module 402 processes the profile generated from the input provided by the user, thereby predicting relevant self-attributes of the user by using algorithms disclosed herein.

The one or more processing modules 401 may comprise the preference prediction module 403 configured to predict the attributes of the preferred match of the user based on the self-attributes predicted by the self-attribute prediction module 402. Further, the recommendation module 404 is configured to provide the recommended matches to the user by accessing at least one memory configured to store data corresponding to the plurality of entities. In one embodiment of the present invention, the memory accessed is located locally on the processor 130, for example, the result database 410. In another embodiment of the present invention, the memory accessed may be located remotely for example, entity database 411. The recommended matches are returned to the user to display on the computing device 120. In an embodiment of the present invention, the matches are presented to the user via the I/O Module 303 (as shown in FIG. 3). The user may provide feedback concerning the matches which are obtained and processed by the feedback module 405.

Although various processing modules disclosed above are in a separate and sequential manner, one skilled in the art would understand that different types of processing can be combined in any applicable manner. For example, in one embodiment of the present invention, the self-attribute prediction processing at module 402 can be combined in one processing step with preference prediction processing at module 403. In another embodiment of the present invention, the processing module 402, 403, 404 can be combined in one processing step. In yet another embodiment of the present invention, the processing module 402, 403, 404, 405 can be combined. In yet another embodiment of the present invention, the processing module 404 and 405 may be combined. It is also possible to skip one or more processing modules and have a current query be directly communicated to a remote server via the communication interface 408.

The processor 130 may comprise I/O interface 409 configured to allow data to be received and/or transmitted by the processor 130. I/O interface 409 may include one or more digital and/or analog communication devices that allow processor 130 to communicate with other machines and devices, such as other components of systems 100.

The processor 130 further comprises memory 407 configured to store instructions used by one or more processing modules 401 to perform operations related to the disclosed embodiments. For example, the memory 407 may be configured with one or more software instructions, such as program(s) that may perform one or more operations, wherein the programs may include a single program or multiple programs. Additionally, the processor 130 may execute one or more programs located remotely. For example, the processor 130, may access one or more remote programs that, when executed, perform functions related to certain disclosed embodiments. Generally, the system 100 is implemented as computer readable, and includes executable instructions stored on a computer readable medium for execution by a general or special purpose processor.

The term computer-readable storage medium as used herein refers to any medium that provides or participates in providing instructions to the processor of the computer (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

The processor 130 may also be communicatively connected to one or more database 411 through the network 110. Database 411 may include one or more storage devices that store information about the plurality of entities and are accessed and/or managed by the processor 130. In one embodiment of the present invention, the database 411 is a part of the processor 130. In another embodiment, the database 411 may be located remotely from the processor 130. The database 411 may include computing components (for example, but not limited to, database management system, database server, or combination thereof configured to receive and process requests for data stored in storage devices of database(s) 411 and to provide data from the entity database 411.

In accordance with the present invention, the components, process operations, and/or data structures described herein may be implemented using various types of operating systems, computing platforms, network devices, computer programs, and/or general purpose machines. Additionally, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Figure 5:
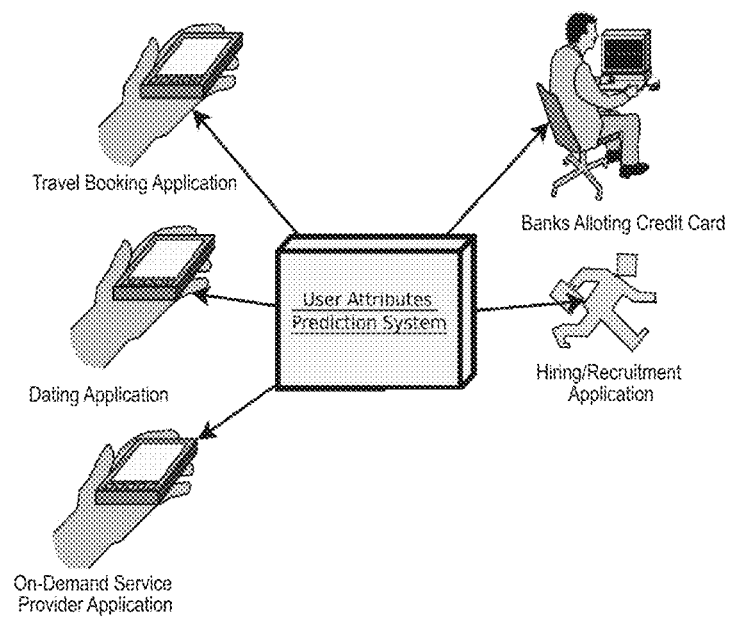
FIG. 5 illustrates various third party sources, consistent with the disclosed embodiments.

The present invention is not limited to a partner seeking application. The matchmaking application of the present invention can be used in several areas for matching users as illustrated in FIG. 5. The single-click action matchmaking of the present invention can be used for, but not limited to, travel booking applications, where the personalized deals to the user are suggested according to the attributes of the user.

Further, the single-click action matchmaking can be used by banks. The banks can find the matches (to whom they can issue a credit card) on the basis of the determination of spending behavior and credibility for a new credit card which can be predicted on the basis of information obtained from the predicted attributes. Another application of the present invention is knowing a student's background and needs. Based on the first name and last name, a school can predict religion, mother tongue, food habits of the student, thereby helping them quickly register the student while asking no or very little information from the student. It can be further applied to match a student with a teacher with a similar language.

Another application where the single-click action matchmaking system can be used, but not limited to, is people-to-people matching in areas such as, but not limited to, dating site, person looking for a life/business/leadership coach, candidate looking for a job, employer finding suitable candidate for the job, real estate business, connecting users to customer care providers, fitness trainer matching, on-demand service providers (e.g. Thumbtack, UrbanClap), finding room-mates.

Those of ordinary skill in the art will realize that the description of the single-click action matchmaking method and system are illustrative only and are not intended to be in any way limiting. Other embodiments will readily suggest themselves to such persons with ordinary skill in the art having the benefit of the present disclosure. Furthermore, the disclosed method and system may be customized to offer valuable solutions to existing needs and problems of providing potential matches of matchmaking services.

Although the present invention has been described in terms of certain illustrated embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The invention may be embodied in other specific forms not explicitly described herein. The embodiments described above are to be considered in all respects as illustrative only and not restrictive in any manner. Thus, scope of the invention is indicated by the following claims rather than by the foregoing description.

What is claimed is:

1. A system for recommending at least one match, the system comprising:
   a) at least one processor adapted to communicate with at least one computing device, and adapted to correspond to at least one user; and
   b) a non-transitory computer storage medium comprising at least one sequence of instruction that, when executed by the processor, causes the processor to:
      i) receive a profile of the user based on an input given by the user at an application running on the computing device;
      ii) predict a plurality of self-attributes of the user based on the inputted profile of the user;
      iii) predict a plurality of preferred attributes based on the plurality of self-attributes of the user;
      iv) access at least one memory configured to store data corresponding to a plurality of entities;
      v) determine the at least one match from the plurality of entities by comparing the predicted preferred attributes with the data corresponding to the plurality of entities; and
      vi) recommend the at least one match to display at the computing device of the user.

2. The system according to claim 1, wherein the input is selected from a group consisting of first name, last name, date of birth, age, contact number, gender, e-mail, verification code, and a combination thereof.

3. The system according to claim 1, wherein the profile of the user is received from at least one third party source.

4. The system according to claim 3, wherein the input comprises a login credential of the user corresponding to at least one third party source.

5. The system according to claim 3, wherein the third party source is selected from a group consisting of a social networking application, a talent hiring application, an on-demand service provider application, a banking application, a travel application, a food provider application, a shopping application, a dating application, a matchmaking application, an e-commerce application, an educational institute application, a real-estate application, a health institute application, a photosharing application, a gaming application, a news application, event application, a social fitness application, a browsing application, an email application, and a combination thereof.

6. The system according to claim 1, the input provided by performing a single-click action.

7. The system according to claim 1, the input provided by performing at least one of a voice command, a gesture command, a tap on a user interface button and a keystroke on a keyboard.

8. The system according to claim 1, wherein the plurality of self-attributes are selected from a group consisting of religion, community, age, height, gender, demographic profile, location, IP address, food habits, mother tongue, education, hobbies, occupation, interests, user's personality, user-specific preferences, ethnicity, job industry, and a combination thereof.

9. The system according to claim 1, wherein the plurality of preferred attributes are selected from a group consisting of religion, community, age, height, gender, demographic profile, location, IP address, food habits, mother tongue, education, hobbies, occupation, interests, user's personality, user-specific preferences, ethnicity, job industry, and a combination thereof.

10. The system according to claim 1, wherein the plurality of entities are selected from a group consisting of partner seekers, job opportunities, goods, products, food items, apparels, vehicles, real-estate, educational institutes, health institutes, games, news, social fitness, events, e-commerce, media, and a combination thereof.

11. The system according to claim 1, wherein the processor is configured to provide an individual rank to the at least one match and generate a list to display at the computing device of the user.

12. The system according to claim 1, wherein the processor is further configured to receive a feedback from the user upon displaying the at least one match on the computing device of the user.

13. The system according to claim 12, wherein the processor is configured to modify recommendation of the at least one match for another user based on the feedback provided by the user.

14. The system according to claim 1, wherein the computing device is selected from a group consisting of a personal digital assistant (PDA), a desktop computer, a television, a pager, a palmtop, a laptop, a notebook, a tablet computer, a mobile phone, a smartphone, a smart-watch, a wearable device, a portable electronic device, and a combination thereof.

15. The system according to claim 1, wherein the plurality of self-attributes and the plurality of preferred attributes are predicted using a machine learning algorithm, the machine learning algorithm selected from a group consisting of SVM regression model, classification model, deep-learning model, neural network, cross-tabulation, heat-map, Bayesian classifier, decision tree, and a combination thereof.

16. The system according to claim 1, wherein the processor is configured to provide the user with an option to modify at least one of the self-attribute, the preferred attribute, and a combination thereof.

17. The system according to claim 1, wherein the user information stored in the computing device is not being used for prediction of the plurality of self-attributes and the plurality of preferred attributes.

18. A computer implemented method for recommending at least one match, the method comprising:
 a) initiating communication between at least one processor and at least one computing device associated with at least one user;
 b) receiving a profile of the user, by the processor, based on an input given by the user at an application running on the computing device;
 c) predicting a plurality of self-attributes of the user, by the processor, based on the inputted profile of the user;
 d) predicting a plurality of preferred attributes of the user based on the plurality of self-attributes of the user, by the processor;
 e) accessing at least one memory by the processor, the memory being adapted to store data corresponding to a plurality of entities;
 f) determining the at least one match from the plurality of entities by comparing the predicted preferred attributes with the data corresponding to the plurality of entities; and
 g) recommending the at least one match, by the processor, for displaying at the computing device of the user.

\* \* \* \* \*